United States Patent
Mizutani

(10) Patent No.: US 9,431,226 B2
(45) Date of Patent: Aug. 30, 2016

(54) HIGH-VOLTAGE POWER UNIT AND MASS SPECTROMETER USING THE POWER UNIT

(71) Applicant: SHIMADZU CORPORATION, Kyoto-shi, Kyoto (JP)

(72) Inventor: Shiro Mizutani, Uji (JP)

(73) Assignee: SHIMADZU CORPORATION, Kyoto (JP)

(*) Notice: Subject to any disclaimer, the term of this patent is extended or adjusted under 35 U.S.C. 154(b) by 0 days.

(21) Appl. No.: 14/440,380

(22) PCT Filed: Nov. 5, 2012

(86) PCT No.: PCT/JP2012/078595
§ 371 (c)(1),
(2) Date: May 4, 2015

(87) PCT Pub. No.: WO2014/068780
PCT Pub. Date: May 8, 2014

(65) Prior Publication Data
US 2015/0287580 A1 Oct. 8, 2015

(51) Int. Cl.
*H01J 49/00* (2006.01)
*H01J 49/02* (2006.01)
*H02M 3/335* (2006.01)
(Continued)

(52) U.S. Cl.
CPC ............ *H01J 49/022* (2013.01); *H01J 49/165* (2013.01); *H01J 49/36* (2013.01); *H02M 3/073* (2013.01); *H02M 3/33507* (2013.01); *H02M 7/103* (2013.01); *H02M 2001/0077* (2013.01); *H02M 2003/071* (2013.01)

(58) Field of Classification Search
USPC ........................................................ 250/292
See application file for complete search history.

(56) References Cited

U.S. PATENT DOCUMENTS 2,397,560 A * 4/1946 Olesen .................. H01J 49/022
250/294
4,103,324 A * 7/1978 Vandervelden ........... G05F 1/12
204/298.08
(Continued)

FOREIGN PATENT DOCUMENTS

| JP | 2004-063431 A | 2/2004 |
| JP | 4687716 B2 | 5/2011 |
| WO | 2007/029327 A1 | 3/2007 |

OTHER PUBLICATIONS

Communication dated Apr. 8, 2016 from the European Patent Office issued in corresponding Application No. 12887817.0.

*Primary Examiner* — Phillip A Johnston
(74) *Attorney, Agent, or Firm* — Sughrue Mion, PLLC

(57) ABSTRACT

An output terminal of a positive voltage generating circuit and an output terminal of a negative voltage generating circuit are connected in series, and an output terminal of the negative voltage generating circuit is connected to a ground via a resistor. A switching circuit and a series connection circuit of resistors are connected in parallel to each other between the output terminals of the positive voltage generating circuit and the negative voltage generating circuit. The switching circuit is on-off driven by a voltage signal taken from a junction point between the resistors, and the switching circuit is on-off driven by a voltage signal taken from a junction point between the resistors. Accordingly, when the polarity of an output voltage is switched, electric charges accumulated up to that point are discharged through the switching circuit of a voltage OFF-side polarity, so that the voltage quickly falls.

10 Claims, 8 Drawing Sheets

(51) Int. Cl.
*H02M 7/10* (2006.01)
*H01J 49/16* (2006.01)
*H01J 49/36* (2006.01)
*H02M 3/07* (2006.01)
*H02M 1/00* (2006.01)

(56) References Cited

U.S. PATENT DOCUMENTS

| | | | | |
|---|---|---|---|---|
| 4,703,190 A | * | 10/1987 | Tamura | H01J 49/022 250/251 |
| 5,354,988 A | * | 10/1994 | Jullien | H01J 3/3376 250/282 |
| 6,002,600 A | | 12/1999 | Scapellati | |
| 6,927,985 B2 | * | 8/2005 | Klinkowstein | H02M 3/3376 363/17 |
| 7,855,355 B2 | * | 12/2010 | Mizutani | H01J 49/022 250/281 |
| 9,058,964 B2 | * | 6/2015 | Makarov | H01J 49/022 |
| 2009/0230297 A1 | | 9/2009 | Mizutani | |

* cited by examiner

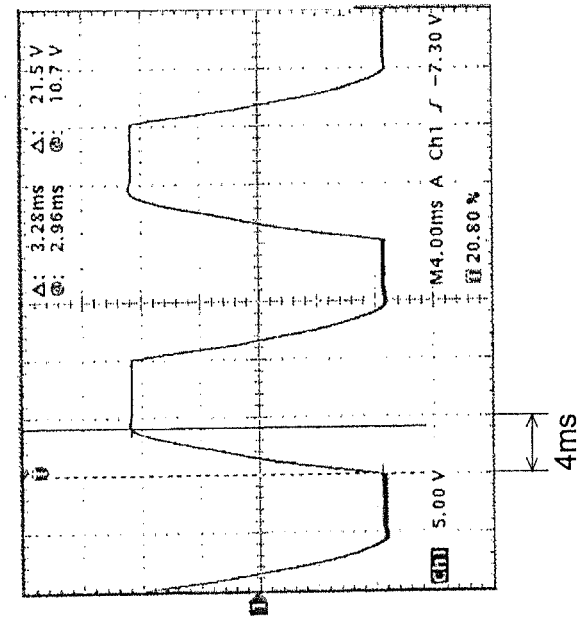
Fig. 4B CIRCUIT OF PRESENT INVENTION
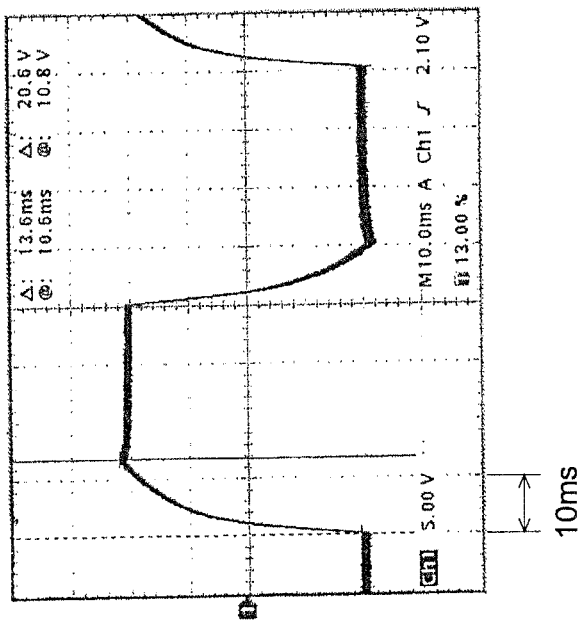
Fig. 4A CONVENTIONAL CIRCUIT

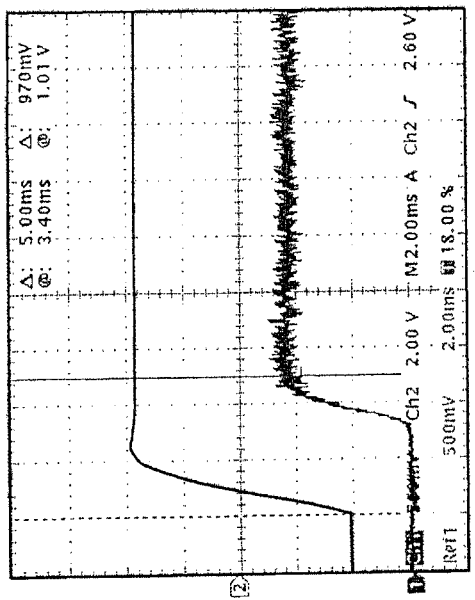
Fig. 5B CIRCUIT OF PRESENT INVENTION
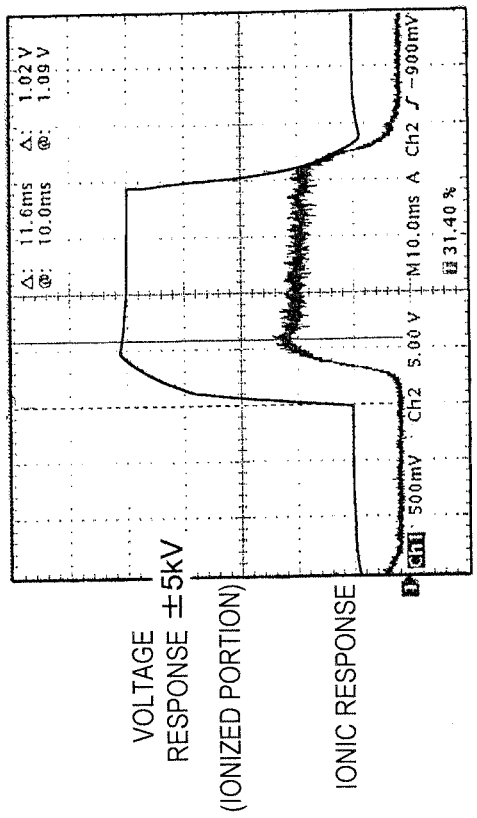
Fig. 5A CONVENTIONAL CIRCUIT
VOLTAGE RESPONSE ±5kV (IONIZED PORTION)
IONIC RESPONSE (a) POSITIVE VOLTAGE OUTPUT (b) NEGATIVE VOLTAGE OUTPUT (c) HIGH-VOLTAGE OUTPUT

POLARITY SWITCHING PERIOD

HIGH-VOLTAGE POWER UNIT AND MASS SPECTROMETER USING THE POWER UNIT

CROSS REFERENCE TO RELATED APPLICATIONS

This is a National Stage of International Application No. PCT/JP2012/078595 filed Nov. 5, 2012, the contents of which are incorporated herein by reference in its entirety.

TECHNICAL FIELD

The present invention relates to a high-voltage power unit capable of switching the polarity of an output voltage between positive and negative, and to a mass spectrometer using the power unit.

BACKGROUND ART

Ion detectors including a combination of a conversion dynode and a secondary-electron multiplier are often used for detecting ions with high sensitivity in a mass spectrometer. In such an ion detector, a high voltage (± several [kV] to ±10 [kV] for example) having a polarity opposite to that of the ions to be analyzed is applied to a conversion dynode for selectively detecting positive ions and negative ions. In a liquid chromatograph mass spectrometer, an ion source according to an electrospray ionization (ESI) method, for example, is used for vaporizing and ionizing a liquid sample. In such an ion source, a high voltage (± several [kV] for example) with the same polarity as that of the ions to be analyzed is applied to the tip of a nozzle for spraying the liquid sample.

In these applications, the polarity of the high voltage to be applied needs to be changed in response to the polarity of the ions to be analyzed. Therefore, a high-voltage power unit having an output voltage capable of switching the polarity of the output voltage is used. One of the most conventionally well-known high-voltage power units for switching high voltages of different polarities is one using a high-voltage reed relay (see, for example, Patent Literature 1).

In a high-voltage power unit using a reed relay, when switching the polarity of the output voltage, spike discharges may occur to break the relay. In order to avoid such a situation, it is necessary to observe the following procedures: decrease the output voltage in one polarity, actuate the relay to change the contacts when the output voltage becomes adequately low, and after that, increase the output voltage in the other polarity. Consequently, it takes some time to switch the polarity. In the case where, for example, the detection of positive ions and negative ions are alternately switched every short period of time, the non-detection time increases in a mass spectrometer. This causes a problem of affecting the accuracy of an analysis.

As a solution to such a problem, a high-voltage power unit capable of switching the polarity of an output voltage at high speed is disclosed in Patent Literature 2. FIG. 7 is a circuit configuration view of principal parts of the high-voltage power unit, and waveform charts (a), (b) and (c) in FIG. 8 are waveform charts illustrating change in a voltage in the case of switching the polarity in the high-voltage power unit. With reference to FIG. 7, and the waveform charts (a), (b) and (c) in FIG. 8, a configuration and operation of the high-voltage power unit will schematically be described.

In the high-voltage power unit, a positive voltage generating circuit 2 includes a transformer T1 as a booster, a drive circuit 3 for driving a primary winding of the transformer T1, and a rectifier circuit using a Cockcroft-Walton circuit composed of four capacitors C1 through C4 and four diodes D1 through D4 connected to the secondary winding of the transformer T1. A negative voltage generating circuit 4 is similar in a basic configuration to the positive voltage generating circuit 2 except for the point that the direction of each of the diodes D5 through D8 in the Cockcroft-Walton circuit is opposite to that in the positive voltage generator 2.

An output terminal P2 of the positive voltage generating circuit 2 and an output terminal Q1 of the negative voltage generating circuit 4 are connected. The other output terminal Q2 of the negative voltage generating circuit 4 is grounded via a resistor 9. Between the output terminals P1 and P2 of the positive voltage generating circuit 2, a resistor 51 is connected in parallel. Between the output terminals Q1 and Q2 of the negative voltage generating circuit 4, another resistor 52 is connected in parallel. A high voltage is output from the output terminal P1 of the positive voltage generating circuit 2 where the polarity is switched. Between this high-voltage output terminal and the ground, a resistor 7 and a resistor 8 are connected in series. A voltage signal is fed back to a control circuit 1 from a junction point between the resistors 7 and 8.

The drive circuits 3 and 5 each include a direct current voltage supply, which is connected in series to the primary winding of the transformer T1, and a switching element. The voltage applied from the direct current voltage supply to the primary winding (or a current to be supplied) is connected and disconnected by the switching element. The pulse width of a rectangular wave signal that performs ON/OFF driving of the switching element is controlled by the control circuit 1. Accordingly, the effective electric power supplied to the primary winding of the transformer T1 is changed, and consequently output voltages of the positive voltage generating circuit 2 and the negative voltage generating circuit 4 are changed.

To output a positive high voltage +HV, the control circuit 1 sends a driving control signal only to the drive circuit 3 on the positive voltage generating circuit 2, so that only the positive voltage generating circuit 2 is operated and the negative voltage generating circuit 4 is stopped. In this case, since a voltage value corresponding to the voltage +HV appearing at the high-voltage output terminal is supplied to the control circuit 1 as a feedback, the control circuit 1 compares this voltage value with a target value, and regulates the driving control signal supplied to the drive circuit 3 in order to reduce the error. Accordingly, the output voltage +HV is precisely set to any target voltage. Contrary to the above case, to output a negative high voltage, the control circuit 1 sends a driving control signal only to the drive circuit 5, so that only the negative voltage generating circuit 4 is operated while the positive voltage generating circuit 2 is stopped.

During a transition period wherein output of the positive high +HV is switched to output of a negative high voltage, the control circuit 1 controls each of the drive circuits 3 and 5 so that the output of the positive voltage generating circuit 2 changes from the voltage +HV to zero, while simultaneously the output of the negative voltage generating circuit 4 changes from zero and subside on a voltage −HV after an overshoot (see waveform charts (a) and (b) in FIG. 8). Thus, by deliberately overshooting the voltage that changes from zero in this way, delay in a fall of the other voltage that returns to zero is compensated for. This makes it possible to quickly reach the target output voltage. Accordingly, the output voltage changes in a short period of time.

In recent years, to meet demands for further enhancement in throughput and higher temporal resolution in measurement in mass spectrometers, high-voltage power units are required to switch the polarity of an output voltage in higher speed. To further reduce the polarity switching time in the high-voltage power unit disclosed in Patent Literature 2 stated above, it is necessary, for example, to further increase an overshoot of a negative voltage when a voltage is switched from positive to negative, or to increase the falling speed of a positive voltage (+HV to zero). To achieve the former, it is necessary to increase the voltage generation capability of the negative voltage generating circuit 4. However, this entails such disadvantages as a significant cost hike of the circuits and an increase in necessary electric energy. To achieve the latter, it is necessary to reduce the resistance value of the resistor 51. However, this entails such disadvantages as an increased power loss in the resistor 51 and a necessity of using expensive resistors which can withstand large electric power.

In the high-voltage power unit, an overshot voltage needs to be fully settled (an overshoot needs to be terminated) before the next switching of the polarity is performed. This is because if the next polarity switching is performed before the overshoot is terminated, a fall of a high voltage after an overshoot is added to a next change (rise) in the high voltage in the direction identical to the fall, and thereby it takes a longer time before settling the voltage after all. Therefore, there is a theoretical limit, in the first place, on the attempt of increasing the polarity switching speed by increasing the overshoot.

As a high-voltage power unit of a quite different type, there is also known a unit including semiconductor switches which are bridge-connected as illustrated in FIG. 9. In this high-voltage power unit, switches 21 and 23 are turned on while switches 22 and 24 are turned off for outputting a positive voltage +HV. For outputting a negative voltage −HV, the switches 22 and 24 are turned on while the switches 21 and 23 are turned off To withstand high voltages, the semiconductor switches 21 to 24 are each constructed to include a large number of FETs connected in series. The gate terminal of each of the FETs is driven via a pulse transformer having high insulation, and the like. However, in such a high-voltage power unit, a large number of pulse transformers are needed, and for driving each of these pulse transformers, drive circuits are also needed. Complicated drive control is also needed to prevent a pair of switches 21 and 23 from being turned on at the same time when a pair of switches 22 and 24 is turned on. Therefore, it is unavoidable that such a power unit becomes quite expensive.

CITATION LIST

Patent Literature

[Patent Literature 1] U.S. Pat. No. 6,002,600 A (see FIG. 1C)
[Patent Literature 2] JP 4687716 B

SUMMARY OF INVENTION

Technical Problem

It is difficult for the aforementioned conventional high-voltage power units to switch the polarity of a high voltage of kV order at speed further higher than before in a relatively inexpensive configuration (practically without a considerable cost hike as compared with the unit disclosed in Patent Literature 2).

The present invention has been made in order to solve such a problem, and an object of the present invention is to provide a high-voltage power unit capable of switching the polarity of an output voltage at high speed while suppressing the cost, and a mass spectrometer using the power unit.

Solution to Problem

A first aspect of the present invention made to accomplish the above-stated object is a high-voltage power unit including, for selectively outputting a high voltage of positive or negative polarity: a positive voltage generating circuit for generating a positive high voltage; a negative voltage generating circuit for generating a negative high voltage; and a control circuit for controlling each of the positive high voltage generated by the positive voltage generating circuit and the negative high voltage generated by the negative voltage generating circuit, wherein one of a pair of output terminals of the positive voltage generating circuit is connected to one of a pair of output terminals of the negative voltage generating circuit to connect the two voltage generating circuits in a series connection, and one of two terminals of the series connection is used as a reference side while the other terminal is used to take out a high-voltage output whose polarity is switched, the high-voltage power unit further including: a) a first impedance-variable circuit section connected between the pair of output terminals of the positive voltage generating circuit; b) a second impedance-variable circuit section connected between the pair of output terminals of the negative voltage generating circuit; c) a first output driver for driving the second impedance-variable circuit section to change an impedance of the second impedance variable circuit section based on a voltage or a current appearing on the pair of output terminals of the positive voltage generating circuit; and d) a second output driver for driving the first impedance-variable circuit section to change an impedance of the first impedance-variable circuit section based on a voltage or a current appearing on the pair of output terminals of the negative voltage generating circuit.

As to the first and second impedance-variable circuit sections, as long as values of the impedance in the first and second impedance-variable circuit sections change in a plurality of stages in response to driving control signals by the second and first output drivers, the number of stages may be any number, and the change may be either continuous or discontinuous (discrete). Accordingly, the first and second impedance-variable circuit sections may be switching circuits for changing the impedance in two stages of a substantially infinite and zero.

A second aspect of the present invention made to accomplish the above-stated object is a high-voltage power unit, including, for selectively outputting a high voltage of positive or negative polarity: a positive voltage generating circuit for generating a positive high voltage; a negative voltage generating circuit for generating a negative high voltage; and a control circuit for controlling each of the positive high voltage generated by the positive voltage generating circuit and the negative high voltage generated by the negative voltage generating circuit, wherein one of a pair of output terminals of the positive voltage generating circuit is connected to one of a pair of output terminals of the negative voltage generating circuit to connect the two voltage generating circuits in a series connection, and one of two terminals of the series connection is used as a reference side while the other is used to take out a high-voltage output whose polarity is switched, the high-voltage power unit further including: a) a first current source disposed in between the pair of output terminals of the positive voltage generating circuit for supplying a variable current from a high voltage side to a low voltage side, the variable current having a maximum current limited to a predetermined value; b) a second current source disposed in between the pair of output terminals of the negative voltage generating circuit for supplying a variable current from the high voltage side to the low voltage side, the variable current having a maximum current limited to a predetermined value; c) a first output driver for driving the second current source to change a current supplied from the second current source based on a voltage or a current appearing at the pair of output terminals of the positive voltage generating circuit; and d) a second output driver for driving the first current source to change a current supplied from the first current source based on a voltage or a current appearing at the pair of output terminals of the negative voltage generating circuit.

In the first and second aspects, the positive voltage generating circuit and the negative voltage generating circuit may each include a booster transformer, and a rectifier circuit using a Cockcroft-Walton circuit connected to a secondary winding of the transformer.

In the high-voltage power unit according to the present invention, the control circuit may control the positive voltage generating circuit and the negative voltage generating circuit, when switching the polarity of the high-voltage output between positive and negative, so that an output voltage of one of the voltage generating circuits changes from a first predetermined voltage to zero, while an output voltage of the other voltage generating circuit simultaneously changes from zero to a second predetermined voltage. More specifically, the control circuit may control the positive voltage generating circuit and the negative voltage generating circuit, when switching the polarity of the high-voltage output between positive and negative, so that an output voltage of one of the voltage generating circuits changes from a first predetermined voltage to zero, while an output voltage of the other voltage generating circuit simultaneously changes from zero to subside on a second predetermined voltage after an overshoot.

The first and second impedance-variable circuit sections in the first aspect may each be a circuit using one or a plurality of FETs for example. When the absolute values of output voltages of the positive voltage generating circuit and the negative voltage generating circuit are beyond a withstand voltage of the FETs (normally, the withstand voltage of the FETs are approximately 1 [kV], whereas an output voltage of the high-voltage power unit required for the mass spectrometer is approximately 10 [kV] at a maximum), a plurality of FETs may be connected in a series connection, and a voltage appearing at the pair of output terminals of the positive voltage generating circuit or the negative voltage generating circuit may be divided by resistors (i.e., the voltage value may substantially be lowered). The divided voltages may be given to the gate terminals of the respective FETs, and a signal from the first or second output driver is supplied to the gate terminal of one of the plurality of FETs in the series connections to change the impedance of the one FET. As a result, a current passing to each of the FETs in the series connection, including the one FET, can be controlled.

For example, as described in the foregoing, among the plurality of FETs in the series connection, the FET whose gate terminal receives a signal from the first or second output driver may be regarded as a current source wherein a current to be supplied changes in response to the signal. In short, this configuration also corresponds to the high-voltage power unit in the second aspect.

When a signal by the first or second output driver is a current signal, the first and second impedance-variable circuit sections or the first and second current sources may be configured to include at least one bipolar transistor, and a current signal by the first or second output driver may be supplied to the base terminal of the transistor.

In the first aspect, the first impedance-variable circuit section connected between the pair of output terminals of the positive voltage generating circuit is substantially not in operation when a positive voltage is output. It operates for the first time when the polarity of an output voltage is switched from positive to negative and a voltage appears on the output terminal of the negative voltage generating circuit. Then, electric charges accumulated on the positive output terminal where the voltage decreases toward zero are discharged through the first impedance-variable circuit section. As a consequence, the positive voltage quickly falls. The second impedance-variable circuit section connected between the pair of output terminals of the negative voltage generating circuit is substantially not in operation when a negative voltage is output. It operates for the first time when the polarity of the output voltage is switched from negative to positive and a voltage appears on the output terminal of the positive voltage generating circuit. Then, electric charges accumulated on the negative output terminal where the voltage (absolute value) decreases toward zero are discharged through the second impedance-variable circuit section. As a consequence, the negative voltage (absolute value) quickly falls.

Thus, in the high-voltage power unit according to the present invention, the impedance between the pair of output terminals where the voltage changes to zero largely falls or a large current passes between the pair of output terminals when the polarity of the output voltage is switched. Accordingly, the voltage (absolute value) falls faster than that in the high-voltage power unit disclosed in Patent Literature 1. This makes it possible to switch the polarity of the output voltage at high speed while suppressing an overshoot amount of the voltage (absolute value) on the rising side. The impedance-variable circuit sections and/or the current sources are driven corresponding to the voltage output from the voltage generation circuit of the other polarity via the first and second output drivers, which eliminates the necessity of a complicated and expensive drive circuit, including a pulse transformer for driving the FETs and an isolation transformer, which was necessary in the unit disclosed in Patent Literature 2.

The high-voltage power unit according to the present invention described in the foregoing may be used in various applications and apparatuses which need a positive high voltage and a negative high voltage in an alternative manner, and the high-voltage power unit is particularly suitable for a mass spectrometer. Specifically, the high-voltage power unit may be used in an ion source and/or an ion detector in a mass spectrometer, which needs to switch the polarity of a high voltage in response to the polarity of the ions to be analyzed. As described in the foregoing, the high-voltage power unit according to the present invention can switch the polarity of the output voltage at high speed. Accordingly, in the case of, for example, alternately performing detection of positive ions and detection of negative ion every short period of time, it is possible to decrease a non-detection period in which both positive and negative ions cannot be detected, and to thereby reduce undetected ions.

Advantageous Effects of Invention

In the high-voltage power unit according to the present invention, high-speed switching of an output voltage between positive and negative polarities can be achieved while the cost can be suppressed to the utmost without increase as compared with the conventional unit. Consequently, in a mass spectrometer using the high-voltage power unit according to the present invention for example, a cycle time of alternate switching between positive ion detection and negative ion detection can be decreased, and mis-detection of ions, both positive and negative, can be reduced thereby.

BRIEF DESCRIPTION OF DRAWINGS

FIG. 4A and FIG. 4B are waveform charts of output voltages observed when the polarity is switched in each of the high-voltage power unit of the present embodiment and the conventional high-voltage power.

FIG. 5A and FIG. 5B are waveform charts of an ionic response observed in the case of applying the high-voltage power unit of the present embodiment and the conventional high-voltage power unit to a mass spectrometer.

DESCRIPTION OF EMBODIMENTS

Figure 1:
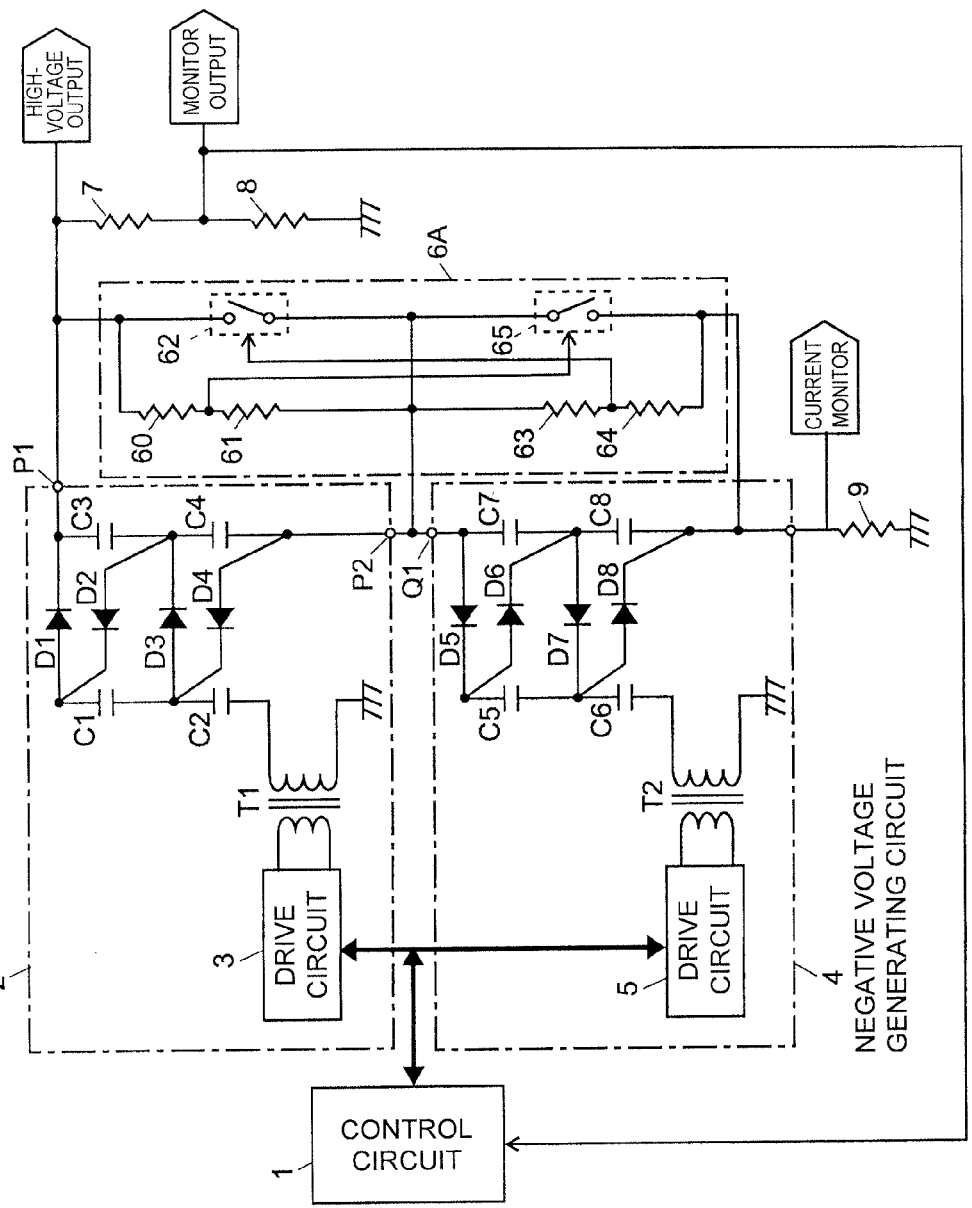
FIG. 1 is a schematic configuration diagram of principle part of a high-voltage power unit according to an embodiment of the present invention.

Hereinafter, one embodiment of a high-voltage power unit according to the present invention will be described in detail in reference to FIG. 1 through FIG. 3A and FIG. 3B. FIG. 1 is a schematic configuration diagram of principal part of the high-voltage power unit in the present embodiment. In FIG. 1, component members identical to those in the conventional high-voltage power unit illustrated in FIG. 7 are designated by identical reference numerals.

Figure 7:
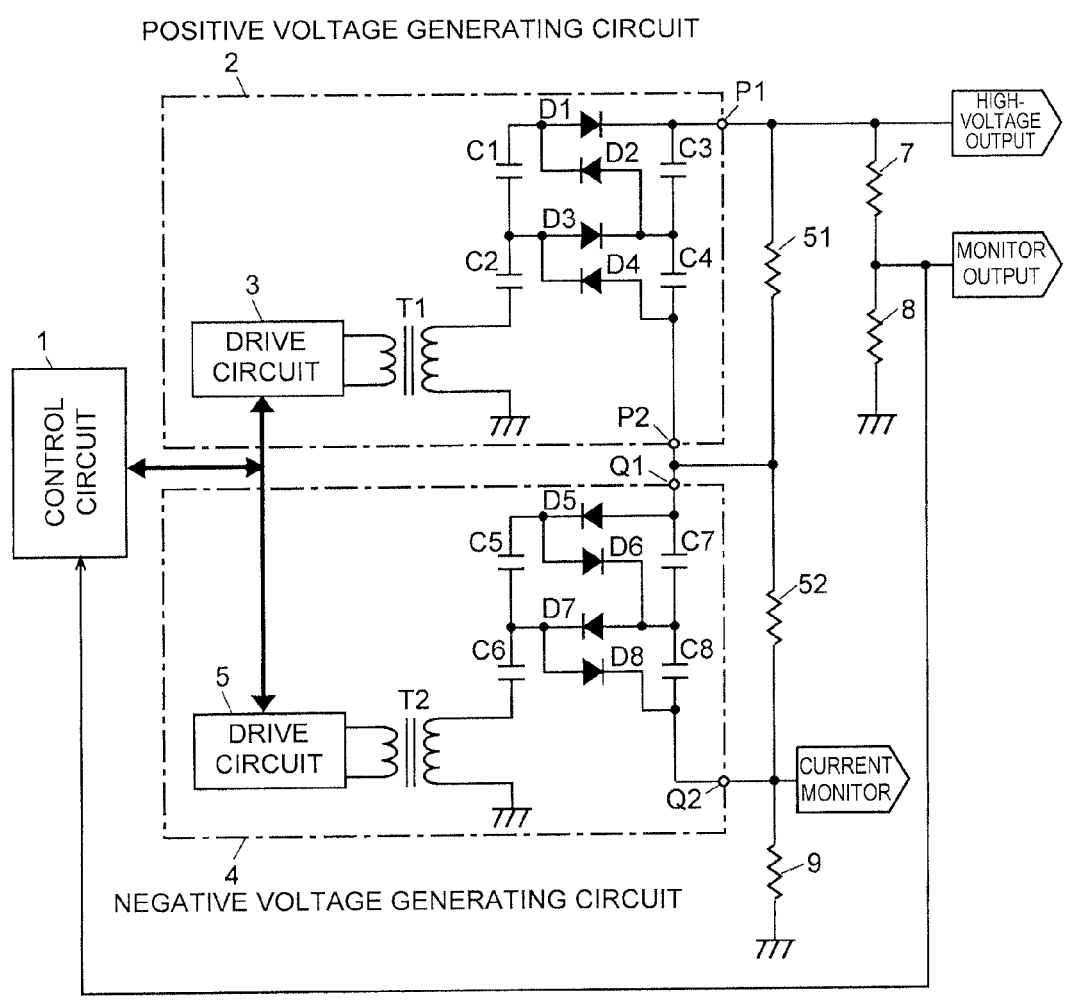
FIG. 7 is a configuration diagram of principal part of the conventional high-voltage power unit disclosed in Patent Literature 2.
Figure 8:
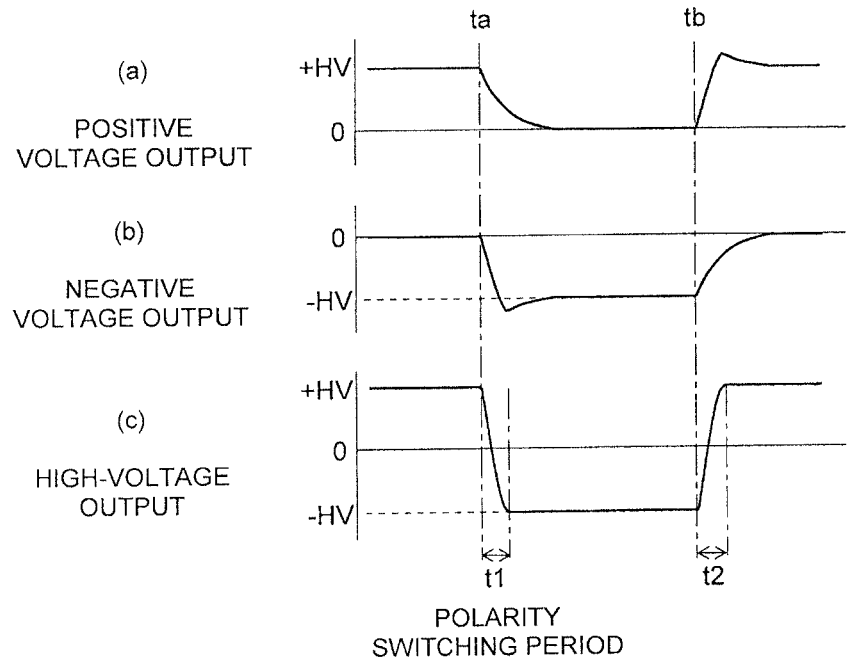
FIG. 8 shows waveform charts (a), (b) and (c) for describing the operation at the time of switching the polarity of an output voltage in the conventional high-voltage power unit.
Figure 9:
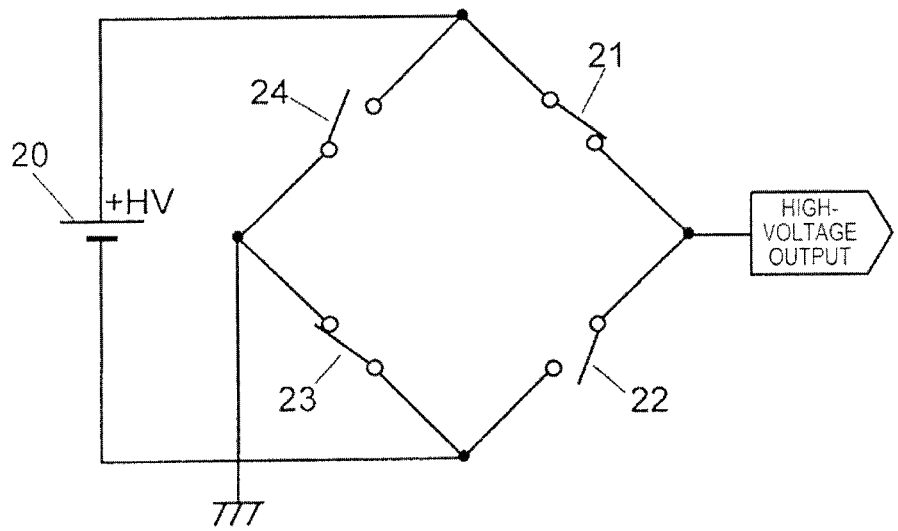
FIG. 9 is a schematic configuration diagram of principal part of another conventional high-voltage power unit.

As is clear from comparison between FIG. 1 and FIG. 7, a control circuit 1, a positive voltage generating circuit 2 and a negative voltage generating circuit 4 which include drive circuits 3 and 5, respectively, and a series connection circuit of resistors 7 and 8 are identical to each other. The high-voltage power unit of the present embodiment and the conventional unit are different in the following point. That is, in the conventional unit, the resistor 51 is connected between the output terminals P1 and P2 of the positive voltage generating circuit 2 and the resistor 52 is connected between the output terminals Q1 and Q2 of the negative voltage generating circuit 4, respectively. In the unit of the present embodiment, a polarity switching auxiliary section 6A, which is different from a simple resistor, is connected to output terminals P1 and P2 of the positive voltage generating circuit 2 and to output terminals Q1 and Q2 of the negative voltage generating circuit 4.

In the polarity switching auxiliary section 6A, a parallel circuit, made up of a series connection circuit of resistors 60 and 61 and a switching circuit 62, is connected between the output terminals P1 and P2 of the positive voltage generating circuit 2. A parallel circuit, made up of a series connection circuit of resistors 63 and 64 and a switching circuit 65, is connected between the output terminals Q1 and Q2 of the negative voltage generating circuit 4. A signal taken from a junction point between the resistors 60 and 61 on a positive polarity side is input as an ON/OFF driving control signal for the switching circuit 65 on a negative polarity side. Conversely, a signal taken from a junction point between the resistors 63 and 64 on the negative polarity side is input as an ON/OFF driving control signal for the switching circuit 62 on the positive polarity side.

A schematic description will be given of the operation at the time of switching the polarity of an output voltage in the high-voltage power unit of the present embodiment. For example, assume that the positive voltage generating circuit 2 is now operated so that a positive high voltage +HV appears in between the output terminals P1 and P2, while the negative voltage generating circuit 4 is substantially in a stopped state so that a voltage between the output terminals Q1 and Q2 is approximately zero. In this case, a voltage which is equal to a division of the high voltage +HV by a ratio between resistance values of these resistors 60 and 61 is generated at the junction point of the resistors 60 and 61. This voltage is given to the switching circuit 65 on the opposite polarity side as a driving control signal, so that the switching circuit 65 is turned on and a line between the output terminals Q1 and Q2 of the negative voltage generating circuit 4 is put in a conductive state.

When the polarity of the voltage is switched from positive to negative in this state, the positive voltage generating circuit 2 is stopped and the negative voltage generating circuit 4 is operated. The voltage between the output terminals P1 and P2 of the positive voltage generating circuit 2 starts to decrease. When the voltage decreases to a predetermined voltage, the switching circuit 65 is turned off, and the voltage (absolute value) between the output terminals Q1 and Q2 of the negative voltage generating circuit 4 conversely increases. Because of this increase, a driving control signal is given to the switching circuit 62 in this time, so that the switching circuit 62 is turned on. As a consequence, electric charges remaining in the output terminal P1 of the positive voltage generating circuit 2 is rapidly discharged through the switching circuit 62 and is quickly lowered to zero.

When the switching circuits 62 and 65 are turned on, the switching circuits 62 and 65 are in the state of being extremely low in the impedance so that current easily passes therethrough. Conversely, when the switching circuits 62 and 65 are turned off, the switching circuits 62 and 65 are in the state of being extremely high in the impedance so that current is hard to pass therethrough. That is, the switching circuits 62 and 65 may be regarded as impedance variable circuits in which an impedance largely changes corresponding to a voltage resistance-divided by the resistors 60 and 61 and the resistors 63 and 64.

Figure 2A:
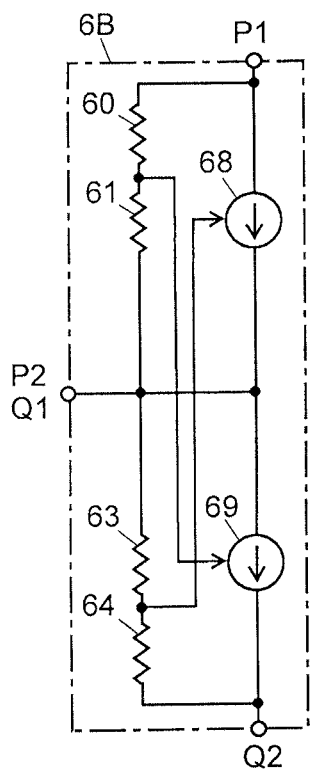
FIG. 2A, FIG. 2B and FIG. 2C illustrate other configuration examples of a polarity switching auxiliary section in FIG. 1.
Figure 2B:
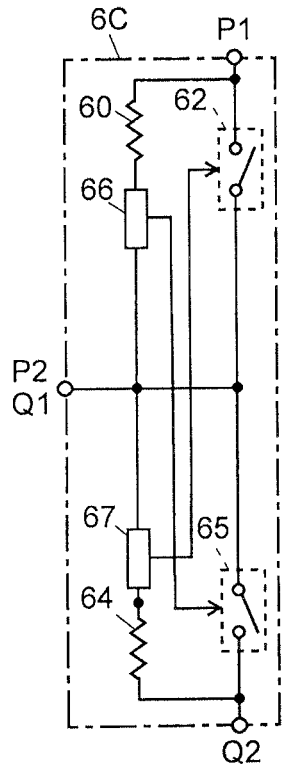
Figure 2C:
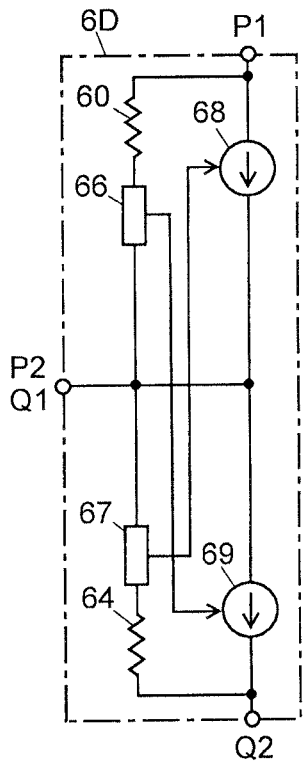
Figure 3A:
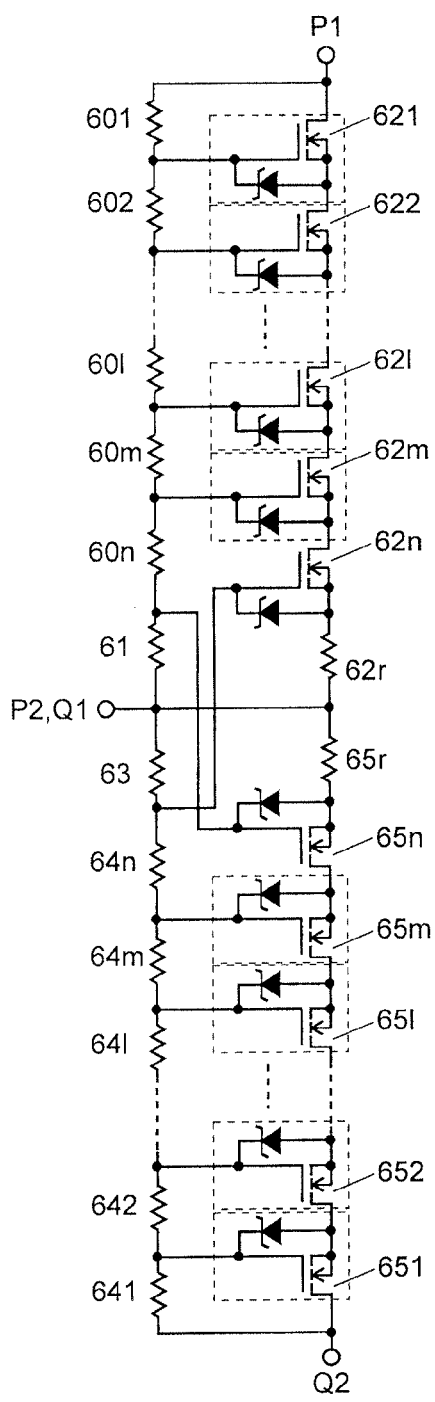
FIG. 3A and FIG. 3B illustrate detailed circuit examples of the polarity switching auxiliary sections illustrated in FIG. 1, FIG. 2A, FIG. 2B and FIG. 2C.

The polarity switching auxiliary section 6A illustrated in FIG. 1 (and polarity switching auxiliary sections 6B, 6C, and 6D illustrated in FIG. 2A, FIG. 2B and FIG. 2C) represents merely a principle configuration. FIG. 3A is a specific circuit configuration example of the polarity switching auxiliary section 6A. In this example, FETs are used as switching elements in the switching circuits 62 and 65. However, it is known that a typical drain terminal-source terminal withstand voltage of a FET is approximately 1 [kV], and therefore when a high voltage of up to approximately ±10 [kV] is output, the withstand voltage of one FET cannot cover it. Accordingly, 10 or more FETs are connected in series, and in order to equalize voltages applied between drain terminals and source terminals of these FET 621 to 62n, a voltage between the output terminals P1 and P2 is divided by resistors 601 to 60n and 61 connected in series, and the divided voltages are each applied to the gate terminals of the FETs 621 to 62n.

A resistor 62r is connected between the output terminal P2 and the source terminal of a FET 62n closest to the low-voltage side, among a large number of the FETs 621 to 62n connected in a series connection. Accordingly, the FET (hereinafter referred to as "drive FET" to distinguish this FET other FETs) 62n controls a current passing through other FETs 621 to 62m (determines the current value). The gate terminal of this drive FET 62n is connected to a junction point between a resistor 64n and a resistor 63 on the negative polarity side. In short, a voltage obtained by resistance-dividing an output voltage on the negative polarity side is applied to the gate terminal of the drive FET 62n on the positive polarity side. The negative polarity side also has the same configuration. Zener diodes connected between the gate terminals and source terminals of all the FETs only function to prevent an overvoltage from being applied to the gate terminals.

Assume the state where a positive high voltage is currently output. In this case, since the output voltage of the negative voltage generating circuit 4 is zero, the voltage at the gate terminal of the drive FET 62n on the positive polarity side is approximately zero. Meanwhile, a voltage obtained by resistance-dividing the output voltage on the positive polarity side is applied to the gate terminal of the drive FET 65n on the negative polarity side. For example, assume that the voltage obtained by resistance-dividing is 10[V], a resistance value of the resistor 65r connected to the source terminal of the drive FET 65n is 1[kΩ], and a gate threshold value (Vth) of the drive FET 65n is 4[V]. In this case, a current of $(10[V]-4[V])/1[k\Omega]=6$ [mA] max may pass to the drive FET 65n and other FETs 651 to 65m in the series connection. However, at the time of outputting a positive voltage, the output voltage (voltage between the output terminals Q1 and Q2) of the negative voltage generating circuit 4 is approximately zero, and therefore a current hardly passes to the drive FET 65n and other FETs 651 to 65m on the negative polarity side in actuality (that is, a current does not actually flow to the drive FET 65n and other FETs 651 to 65m though they have an ability to pass the current).

On the contrary, when a negative high voltage outputting state is switched to a positive high voltage outputting state, and a voltage between the output terminals P1 and P2 of the positive voltage generating circuit 2 is in the middle of rising, a current of up to 6 [mA] passes to the drive FET 65n and other FETs 651 to 65m since electric charges are accumulated at the output terminals of the negative voltage generating circuit 4. As a consequence, the accumulated electric charges are quickly discharged.

As a comparison with the configuration of the present embodiment, the case of the conventional high-voltage power unit illustrated in FIG. 7 is considered.

For example, assume that a resistance value of the resistor 52 connected in parallel to the output terminals Q1 and Q2 is 50[MΩ] and a capacitance of a capacitor in an output section is 100 [pF] when an output voltage is 10 [kV]. In this case, the voltage on the voltage OFF-side at the time of polarity switching decreases by a time constant of $=50$ [MΩ]·100 [pF]=5 [ms]. When a voltage fall time tf is tf=3τ, tf=15 [ms] is obtained. In comparison, in the high-voltage power unit of the present embodiment, when the output voltage and the capacitance of capacitor in the output section are similarly 10 [kV] and 100 [pF], respectively, tf=dt=C·dv/i=100 [pF]·10 [kV]/6 [mA]=0.17 [ms] is obtained from Q=CV. That is, while the conventional high-voltage power unit takes 15 [ms] for a fall of a voltage on the voltage OFF-side at the time of switching the polarity of the output voltage, the high-voltage power unit of the present embodiment takes 0.17 [ms] for a fall of the voltage on the voltage OFF-side, so that a considerable reduction in the fall time is achieved.

In the circuit illustrated in FIG. 3A which embodies the polarity switching auxiliary section 6A illustrated in FIG. 1, series connection circuits of FETs including the drive FETs 62n and 65n are equivalent to the first and second impedance-variable circuit sections in the present invention, and series connection circuits of resistors each including the resistors 60n and 61 and the resistors 64n and 63 for giving driving control signals to drive the drive FETs 62n and 65n are equivalent to the first and second output drivers in the present invention. The former, i.e., the series connection circuits of FETs may also be regarded as a current source with a limited maximum current as described before. That is, the series connection circuits of FETs including the drive FETs 62n and 65n may be regarded as first and second current sources in the present invention. Therefore, the polarity switching auxiliary section 6B of FIG. 2A, which represents a principle configuration different from that of the polarity switching auxiliary section 6A in FIG. 1, may include the switching circuits 62 and 65 as variable current sources 68 and 69, respectively.

Figure 3B:
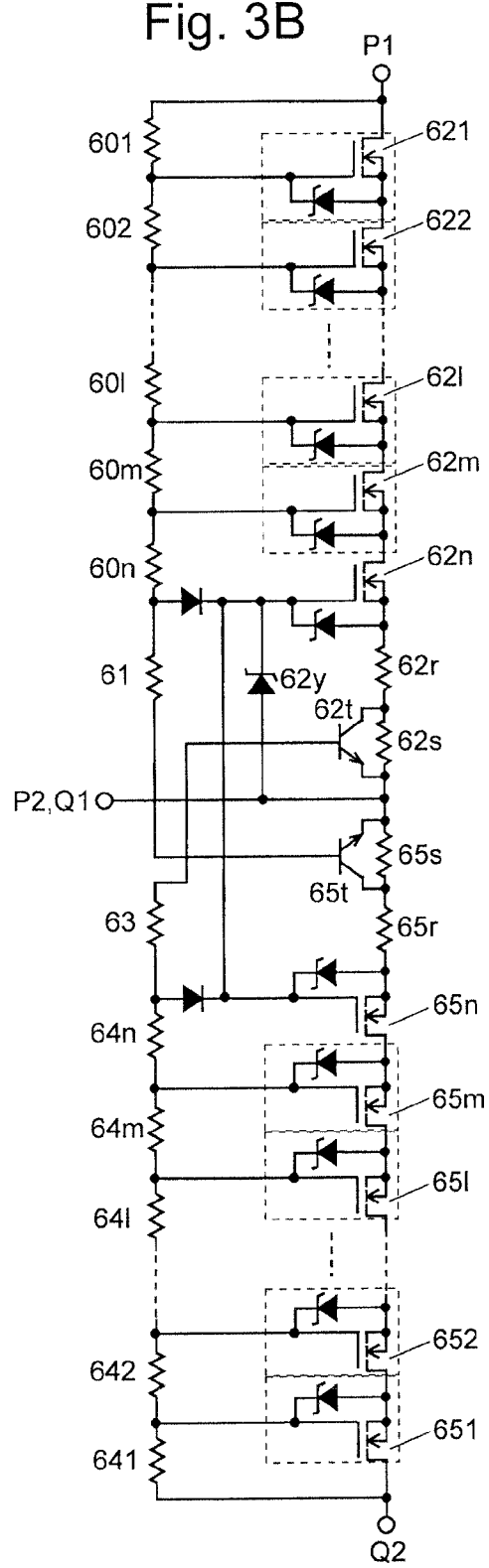

Although both the polarity switching auxiliary sections 6A and 6B take out signals for driving the impedance variable circuits and the current sources from the voltages, they may take out the signals from currents. FIG. 2B and FIG. 2C are principle configuration diagrams of polarity switching auxiliary sections 6C and 6D using current drivers 66 and 67 for taking out current signals via resistors. FIG. 3B is a specific circuit configuration example of the polarity switching auxiliary sections 6C and 6D.

In the circuit example of FIG. 3B, a voltage appearing at the output terminals P1, P2, Q1, and Q2 of the positive and negative voltage generation circuits 2 and 4 is divided into voltages by a Zener diode 62y, the resistors 601 to 60n, and the resistors 641 to 64n, and these voltages are collectively applied to the gate terminals of the drive FETs 62n and 65n on the same polarity side. A current passing through the resistors 601 to 60n, and the resistors 641 to 64n provided for the voltage division is taken out via the resistors 61 and 63, and is supplied as a current signal to the base terminals of the bipolar transistors 62t and 65t, which are connected to the source terminals of the drive FETs 62n and 65n. As a result, the transistors 62t and 65t are turned on and off, and the drive FETs 62n and 65 are operated thereby. In short, while the drive FETs 62n and 65n are driven by the voltage in FIG. 3A, the drive FETs 62n and 65n are driven by the current in FIG. 3B.

For example, the resistors 62r and 65r connected in series to the source terminals of the drive FETs 62n and 65n are set to 1[kΩ], the resistors 62s and 65s are set to 1 [MΩ], and the bipolar transistors 62t and 65t are connected in parallel to these resistors 62s and 65s. If the gate terminal voltage of the drive FETs 62n and 65n is 10[V], a current as extremely small as (10[V]−4[V])/1 [MΩ]=6 [μA] max passes to the drive FETs 62n and 65n when the transistors 62t and 65t are turned off. When the transistors 62t and 65t are turned on, a current of (10[V]−4[V])/1 [kΩ]=6 [mA] max passes. Therefore, in the configuration of FIG. 3B, like the configuration of FIG. 3A described before, it is possible to increase the speed of a fall of a voltage on the voltage OFF-side when the polarity of an output voltage is switched, and to thereby achieve swift polarity switching.

When the circuit of FIG. 3A is compared with the circuit of FIG. 3B, the latter is more advantageous in terms of the speed increase. This is because in the configuration of FIG. 3A, the gate terminals of the drive FETs 62n and 65n are charged and discharged, and therefore in the case of using FETs whose gate terminals have a large parasitic capacitance, it takes some time to charge and discharge the gate terminals, so that some time is taken for operating the drive FETs 62n and 65n, and proportionally a slight time is taken for a fall of a voltage on the voltage OFF-side. Contrary to this, in the configuration of FIG. 3B, the gate terminals of the drive FETs 62n and 65n are constantly charged regardless of the polarity of the voltage at the time of voltage output, so that the operation of the drive FETs 62n and 65n is quickly started and the voltage falls at high speed on the voltage OFF-side.

Figure 6:
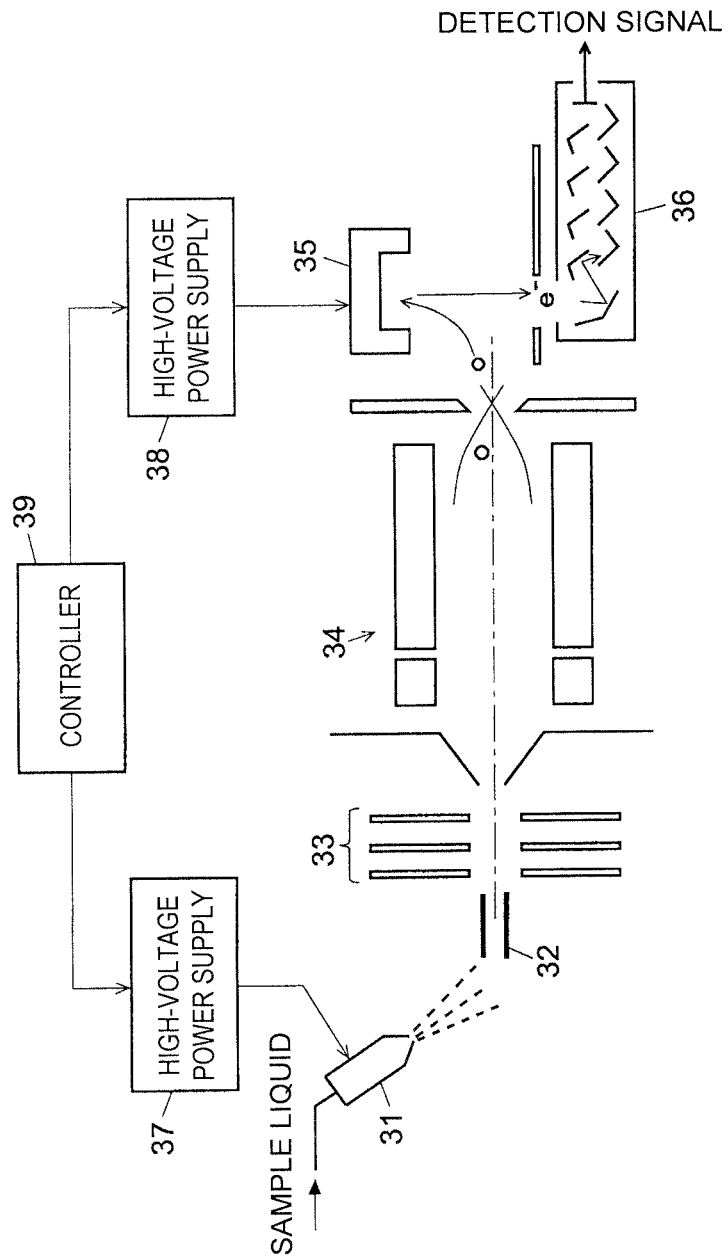
FIG. 6 is a schematic configuration diagram of a mass spectrometer using the high-voltage power unit of the present embodiment.

FIG. 6 illustrates an example of the schematic configuration of a mass spectrometer using the high-voltage power unit according to the present embodiment. This mass spectrometer is used for analyzing a sample liquid eluted from a liquid chromatograph for example. The sample liquid is sprayed into an atmosphere of approximate atmospheric pressure from a nozzle 31 for an electrospray. This ionizes sample atoms and molecules contained in the sample liquid. In this process, high voltages (normally, several [kV]) with different polarities according to the polarity of the ions to be generated are to be applied to the tip of the nozzle 31. As a voltage source therefor, a high-voltage power unit 37 of a polarity switching type as described earlier can be used.

The ions generated by the aforementioned ionization are sent to a subsequent stage through a desolvation pipe 32, and are focused by an ion lens 33 driven by a voltage source, which is not illustrated, before being introduced into a space across the long axis of a quadrupole filter 34. A voltage in which an RF voltage and a DC voltage are superposed is applied to the quadrupole filter 34 by the voltage source which is not illustrated. The voltage forms an electric field, by which only ions having a predetermined mass to charge ratio pass through the quadrupole filter 34. A high voltage (normally, approximately 10 [kV]) with a polarity opposite to that of the ions to be analyzed is applied to a conversion dynode 35 in the further subsequent stage by a high-voltage power unit 38 of a polarity switching type as previously described. The ions induced by the electric field by the high voltage touch the conversion dynode 35 to emit secondary electrons. The emitted secondary electrons fly downward and reach a secondary electron multiplier 36. They are multiplied inside the secondary electron multiplier 36, and a detection signal corresponding to the number of the secondary electrons that flew in first, i.e. the number of the ions that reach the conversion dynode 35, is taken out.

That is, in the mass spectrometer with the previously-described configuration, the controller 39 sends control signals for switching to each of the high-voltage power units 37 and 38 in accordance with the polarity of the ions to be analyzed. Since switching of the polarity of the output voltage in the high-voltage power units 37 and 38 can quickly be performed as described earlier, the time in which ion detection cannot be performed is decreased even in the case where, for example, positive ion detection and negative ion detection are repeatedly performed alternately every short period of time. Accordingly, fine mass chromatograms and total ion chromatograms can be created.

FIG. 6 is an example of a simplified configuration. It is apparent that the previously-described high-voltage power unit of a polarity switching type may be used in a portion other than that described earlier.

FIG. 4A, FIG. 4B, FIG. 5A and FIG. 5B show waveforms actually observed when the polarity is switched in each of the high-voltage power unit of the configuration illustrated in FIG. 3B and the conventional high-voltage power unit (conventional circuit). FIG. 4A and FIG. 4B illustrate voltage response waveforms at the time of switching the polarity of a voltage (±10 [kV]) applied to a conversion dynode. FIG. 5A and FIG. 5B are ionic response waveforms at the time of switching the polarity of a voltage in order to switch the polarity of the ions to be measured in a mass spectrometer as illustrated in FIG. 6. As illustrated in FIG. 4A and FIG. 4B, about 14 [ms] is needed to switch the polarity in the conventional circuit, whereas in the present invention circuit, the polarity switching time is reduced to approximately 3 [ms]. As illustrated in FIG. 5A and FIG. 5B, in the present invention circuit, the speed of switching the polarity of a voltage is increased, so that a rising speed of the ion detecting signal is also drastically increased.

The above-stated observed results indicate that the high-voltage power unit according to the present invention is very effective for switching the polarity of the ions to be measured in a mass spectrometer.

The configurations of the high-voltage power unit described in the previously-described embodiment is merely an example of the present invention, and it is clear that any modifications, additions and adjustment to be made appropriately within the scope of the present invention are also embraced in the scope of the claims of the present application. It is also clearly understood that the high-voltage power unit according to the present invention is not only applicable to the mass spectrometers, but also to various applications and apparatuses which need to switch high voltages of approximately ± several [kV] at high speed.

REFERENCE SIGNS LIST

1 . . . Control Circuit
2 . . . Positive Voltage Generating Circuit
4 . . . Negative Voltage Generating Circuit
3, 5 . . . Drive Circuit
C1-C8 . . . Capacitors
D1-D8 . . . Diode
T1, T2 . . . Transformer
P1, P2, Q1, Q2 . . . Output Terminal
10 . . . Resistor
31 . . . Nozzle
32 . . . Desolvation Pipe
33 . . . Ion Lens
34 . . . Quadrupole Filter
35 . . . Conversion Dynode
36 . . . Secondary Electron Multiplier
37 . . . High-voltage Power Unit
38 . . . High-voltage Power Unit
39 . . . Controller 60, 61, 601-60*n*, 62*r*, 62*s*, 63, 64, 641-64*n*, 65*r*, 65*s*, 7, 8, 9 . . . Resistor
62, 65 . . . Switching Circuit
621-62*m*, 651-65*m* . . . FET
62*n*, 65*n* . . . Drive FET
62*t*, 65*t* . . . Bipolar Transistor
62*y* . . . Zener Diode
66, 67 . . . Current Driver
68, 69 . . . Variable Current Source
6A, 6B, 6C, 6D . . . Polarity Switching Auxiliary Section

The invention claimed is:

1. A high-voltage power unit, comprising, for selectively outputting a high voltage of positive or negative polarity:
a positive voltage generating circuit for generating a positive high voltage;
a negative voltage generating circuit for generating a negative high voltage; and
a control circuit for controlling each of the positive high voltage generated by the positive voltage generating circuit and the negative high voltage generated by the negative voltage generating circuit, wherein
one of a pair of output terminals of the positive voltage generating circuit is connected to one of a pair of output terminals of the negative voltage generating circuit to connect the two voltage generating circuits in a series connection, and
one of two terminals of the series connection is used as a reference side, while the other terminal is used to take out a high-voltage output whose polarity is switched,
the high-voltage power unit further comprising:
a) a first impedance-variable circuit section connected between the pair of output terminals of the positive voltage generating circuit;
b) a second impedance-variable circuit section connected between the pair of output terminals of the negative voltage generating circuit;
c) a first output driver for driving the second impedance variable circuit section to change an impedance of the second impedance-variable circuit section based on a voltage or a current appearing at the pair of output terminals of the positive voltage generating circuit; and
d) a second output driver for driving the first impedance-variable circuit section to change an impedance of the first impedance-variable circuit section based on a voltage or a current appearing at the pair of output terminals of the negative voltage generating circuit.

2. A high-voltage power unit, comprising, for selectively outputting a high voltage of positive or negative polarity:
a positive voltage generating circuit for generating a positive high voltage;
a negative voltage generating circuit for generating a negative high voltage; and
a control circuit for controlling each of the positive high voltage generated by the positive voltage generating circuit and the negative high voltage generated by the negative voltage generating circuit, wherein
one of a pair of output terminals of the positive voltage generating circuit is connected to one of a pair of output terminals of the negative voltage generating circuit to connect the two voltage generating circuits in a series connection, and
one of two terminals of the series connection is used as a reference side, while the other terminal is used to take out a high-voltage output whose polarity is switched,
the high-voltage power unit further comprising:
a) a first current source disposed in between the pair of output terminals of the positive voltage generating circuit for supplying a variable current from a high voltage side to a low voltage side, the variable current having a maximum current limited to a predetermined value;
b) a second current source disposed in between the pair of output terminals of the negative voltage generating circuit for supplying a variable current from the high voltage side to the low voltage side, the variable current having a maximum current limited to a predetermined value;
c) a first output driver for driving the second current source to change a current supplied from the second current source based on a voltage or a current appearing on the pair of output terminals of the positive voltage generating circuit; and
d) a second output driver for driving the first current source to change a current supplied from the first current source based on a voltage or a current appearing on the pair of output terminals of the negative voltage generating circuit.

3. The high-voltage power unit according to claim 1, wherein
the first and second impedance-variable circuit sections each include: drive FETs that are ON/OFF driven by the first and second output drivers; and a plurality of FETs connected in series to the drive FETs.

4. The high-voltage power unit according to claim 2, wherein
the first and second current sources each include: drive FETs that are ON/OFF driven by the first and second output drivers; and a plurality of FETs connected in series to the drive FETs.

5. The high-voltage power unit according to claim 1, wherein
the control circuit controls the positive voltage generating circuit and the negative voltage generating circuit, when switching the polarity of the high-voltage output between positive and negative, so that an output voltage of one of the voltage generating circuits changes from a first predetermined voltage to zero while simultaneously an output voltage of the other voltage generating circuit changes from zero to subside on a second predetermined voltage after an overshoot.

6. A mass spectrometer using a high-voltage output by the high-voltage power unit according to claim 1 in an ion source and/or an ion detector, wherein
a polarity of the high-voltage output by the high-voltage power unit is switched corresponding to a polarity of ions to be analyzed.

7. The high-voltage power unit according to claim 2, wherein
the control circuit controls the positive voltage generating circuit and the negative voltage generating circuit, when switching the polarity of the high-voltage output between positive and negative, so that an output voltage of one of the voltage generating circuits changes from a first predetermined voltage to zero while simultaneously an output voltage of the other voltage generating circuit changes from zero to subside on a second predetermined voltage after an overshoot.

8. The high-voltage power unit according to claim 3, wherein
the control circuit controls the positive voltage generating circuit and the negative voltage generating circuit, when switching the polarity of the high-voltage output between positive and negative, so that an output voltage of one of the voltage generating circuits changes from a first predetermined voltage to zero while simultaneously an output voltage of the other voltage generating circuit changes from zero to subside on a second predetermined voltage after an overshoot.

9. The high-voltage power unit according to claim 4, wherein
the control circuit controls the positive voltage generating circuit and the negative voltage generating circuit, when switching the polarity of the high-voltage output between positive and negative, so that an output voltage of one of the voltage generating circuits changes from a first predetermined voltage to zero while simultaneously an output voltage of the other voltage generating circuit changes from zero to subside on a second predetermined voltage after an overshoot.

10. A mass spectrometer using a high-voltage output by the high-voltage power unit according to claim 2 in an ion source and/or an ion detector, wherein
a polarity of the high-voltage output by the high-voltage power unit is switched corresponding to a polarity of ions to be analyzed.

* * * * *